United States Patent
McDaniel et al.

(10) Patent No.: US 6,465,586 B2
(45) Date of Patent: *Oct. 15, 2002

(54) POLYMERIZATION CATALYST AND PROCESS

(76) Inventors: Max P. McDaniel, 1601 Melmart Dr., Bartlesville, OK (US) 74006; Elizabeth A. Benham, 431 Shannon, Bartlesville, OK (US) 74006

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/440,366

(22) Filed: Nov. 12, 1999

(65) Prior Publication Data

US 2002/0013432 A1 Jan. 31, 2002

(51) Int. Cl.$^7$ .................................................. C08F 4/44
(52) U.S. Cl. ....................... 526/129; 526/105; 526/106; 526/348.4; 526/348
(58) Field of Search ................................ 526/105, 106, 526/129, 348, 348.4

(56) References Cited

U.S. PATENT DOCUMENTS

| | | | |
|---|---|---|---|
| 4,053,436 A | 10/1977 | Hogan et al. | 502/236 |
| 4,101,722 A | 7/1978 | Hogan et al. | 526/106 |
| 4,312,967 A | 1/1982 | Norwood et al. | 526/64 |
| 4,818,800 A * | 4/1989 | McDaniel et al. | 526/106 |
| 5,166,279 A | 11/1992 | Speakman | 526/97 |
| 5,473,027 A | 12/1995 | Batchelor et al. | 526/106 |
| 5,539,076 A | 7/1996 | Nowlin et al. | 526/348.1 |
| 5,576,263 A * | 11/1996 | Bradley et al. | 502/237 |

* cited by examiner

*Primary Examiner*—David W. Wu
*Assistant Examiner*—William K Cheung

(57) ABSTRACT

An olefin polymerization process is provided comprising contacting an olefin monomer with chromium oxide on a titanium containing silica support having less than about 3 weight percent titanium in combination with an organoboron promoter. Polymers thus produced are useful for blow molding applications.

8 Claims, No Drawings

POLYMERIZATION CATALYST AND PROCESS

BACKGROUND OF THE INVENTION

This invention relates to modified supported chromium oxide olefin polymerization catalyst systems.

It further relates to a method of making ethylene polymers and copolymers.

Supported chromium oxide catalyst systems have been used for many years in the polymerization of olefins. Ethylene can be polymerized by contacting the monomer with a silica-supported chromium oxide catalyst systems, the reaction being carried out in an inert liquid at temperatures below 110° C. for producing solid polymer suspended in the liquid or at temperatures above 110° C. for solution polymerization. The properties of the resulting polymer depend upon a number of factors, including the type of catalyst system employed and its activation temperature, the reaction pressure, and the reaction temperature. It is generally known that titanium can be added to the supported chromium oxide catalyst systems to produce a polymer having an increased melt index and a broader molecular weight distribution. It is also generally known that certain substances called promoters or adjuvants can be used in combination with chromium oxide catalyst systems to modify the properties of the polymer.

The use of chromium catalyst systems with certain organoboron promoters generally is known to broaden the polymer molecular weight distribution. Use of titanium in the catalyst system support or boron adjuvants in the reactor can result in improvements in the environmental stress crack resistance (ESCR) of the resultant polymers, as well as increased catalyst system productivity. Unfortunately, these modifications can increase the amount of low molecular weight polymer and oligomers that are formed. Low molecular weight polymers and oligomers can contribute smoke and odor during the processing of the polymer, or resin, as it is molded into bottles and other articles of manufacture.

Another important characteristic of a blow molding resin is the swell properties of the resin. Two kinds of swell are critical during blow molding. These are "weight swell" and "diameter swell"; the later also is referred to herein as "die swell". As polymer, or resin, is extruded under pressure through a die opening and into a mold, a polymer has a tendency to swell as it exits the die. This is known as weight swell and can be determinative of the thickness of bottle wall, as well as the overall weight of the resultant blow molded product. For example, a resin which is extruded through a 0.02 inch die gap might yield a bottle wall thickness of 0.06 inches, in which case the weight swell is said to be 300%. A resin that swells too much can produce a bottle with too thick of a wall. To compensate, the die opening, or gap, can be narrowed by manual adjustment. However, any decrease in die gap can increase the resistance to the flow of the resin through the die. Narrower die gaps can result in higher shear rates during extrusion which also can increase melt fracture leading to a rough bottle surface. Thus, a resin which can be described as easily processable must exhibit low weight swell, which allows a wide die gap.

Diameter, or die, swell refers to how much a parison flares out as it is extruded from the die. For example, a resin extruded through a circular die of one (1) inch diameter can yield a parison tube of 1.5 inches in diameter; the die swell is said to be 50%. Die swell is significant because molds usually are designed for a certain amount of flare; too much die swell can interfere with molding of a bottle handle. A high degree of weight swell often causes high die swell because of the narrow die gap. Unfortunately, a narrow gap also increases the resistance to polymer flow. Thus, as used herein, a polymer which is considered easily processable also should exhibit low die swell.

Attempts have been made to obtain ethylene polymers having a broader molecular weight distribution (MWD) and consequent improved environmental stress crack resistance imparted by organoboron promoters and titania-containing catalyst systems. One of the most prevalent problems associated with such attempts is an increase of the amount of swell exhibited by the resin as it exits the die. Swell can be decreased by raising the activation temperature of the catalyst system, however, this also can reduce the polymer ESCR. Swell also can be decreased by lowering the melt index (MI), but this generally makes the resin more difficult to process, as measured by output rate and melt fracture. Swell also can be decreased by adding more chromium to the catalyst system, but this tends to impart a dirty color to the final polymer product. Thus, it has been difficult to produce a resin that maintains good swell and processing characteristics, high ESCR, and a low volatiles content.

SUMMARY OF THE INVENTION

It is an object of this invention to provide a process by which high density ethylene polymers and copolymers can be manufactured having a high stress crack resistance are prepared in high yield.

It is a further object of the invention to minimize the production of oligomers and low molecular weight polymer during the polymerization process.

It is a further object of this invention to minimize the amount of die swell and weight swell exhibited by the resin during molding.

It is a further object of this invention to provide a blow molding polymer which processes well in the blow molding machine.

In accordance with one embodiment of the invention, a polymerization catalyst system is provided which comprises chromium oxide on a silica-titania, wherein said support comprises less than about 3 weight percent titanium, in combination with an organoboron promoter. Further according to the invention, an ethylene polymer or copolymer is produced by contacting an ethylene monomer, and an optional comonomer, with an activated catalyst system comprising chromium oxide on a silica-titania, wherein said support comprises less than about 3 weight percent titanium, in the presence of an organoboron promoter. The resulting polymer is produced in high yield and has a combination of improved properties, including high shear response, good environmental stress crack resistance, and high density.

DETAILED DESCRIPTION OF THE INVENTION

The silica containing substrates, or supports, used in the invention catalyst systems are silica or silica-alumina gels. Such gels conventionally are prepared by mixing an acid such as sulfuric acid with an aqueous solution of an alkali metal silicate such as sodium silicate to produce an aqueous gel, or hydrogel. The silicate preferably is added to the acid, and the reaction mixture is strongly agitated. The mixing temperature can range from about 1° C. to about 43° C. The resulting hydrogel is approximately 3 to about 12 weight percent $SiO_2$ and has a pH in a range of about 3 to about 9. The hydrogel is aged at a temperature of about 18° C. to 98° C. for a suitable time, generally more than one hour. Silica gels often have a minor portion, generally not exceeding 20 weight percent, of alumina or other metal oxides, an the support of the invention includes composite silica gels comprising silica and alumina, thoria, zirconia and like substances.

As used in this disclosure, the term "support" refers to a carrier for another catalytic component. However, by no means, is a support necessarily an inert material; it is possible that a support can contribute to catalytic activity and selectivity.

The hydrogel then is washed with water and either an ammonium salt solution or a dilute acid to reduce the alkali metal content of the hydrogel to less than about 0.1 weight percent. The ammonium salt solution is preferably one such as ammonium nitrate or an ammonium salt of an organic acid which volatizes upon subsequent calcination.

Water in the hydrogel can be removed by any conventional method, such as, foe example, by spray drying, vacuum oven drying, or air oven drying at temperatures above 100° C. If the hydrogel is dried by heating, it is not necessary to add an agent to the gel to prevent shrinkage of the pores.

The support must comprise titanium. Titanation of the silica can be effected using a variety of methods. The titanated catalyst systems must comprise no more than about 3 weight percent titanium, based on the weight of the catalyst system (not including the organoboron component), after calcining. All or part of the titanium can be supplied by coprecipitation of silica and titania. In the coprecipitation method, a titanium compound, such as, for example, a titanium halide, nitrate, sulfate, oxalate, or alkyl titanate, can be incorporated with the acid or the silicate in an amount such that the amount of titanium present as titanium dioxide in the final calcined catalyst system is less than about 3 weight percent. The amount of titanium in the calcined catalyst system generally will be about 0.5 weight percent to about 3.0 weight percent, preferably within a range of about 0.5 to about 2.6 weight percent. Most preferably, the amount of titanium in the catalyst system support is within a range of 0.8 to 1.5 weight percent. The coprecipitation of titania with silica is disclosed in U.S. Pat. No. 3,887,494, the disclosure of which is hereby incorporated by reference.

Titanation of the catalyst system support alternatively can be effected by impregnation of the hydrogel or xerogel before or after incorporation of the chromium component of the catalyst system. For example, an aqueous solution of a hydrolysis-resistant titanium compound can be incorporated into a silica hydrogel and dried by conventional techniques.

Titanation of the silica support also can be accomplished by adding a titanium compound to the silica xerogel, usually with heat to vaporize the solvent and cause titanium to be deposited on the support.

Particularly advantageous catalyst systems useful in this invention are silica-titanias created by twice aging, as disclosed in U.S. Pat. No. 4,981,831, the disclosure of which is hereby incorporated by reference.

The chromium component of the catalyst system comprises about 0.5% to about 4% weight percent chromium, preferably about 0.8 to about 2.0 weight percent, based on the weight of the calcined catalyst system and most preferably between 0.8 and 1.5 weight percent. The chromium component can be coprecipitated with the silica or the silica-titania or added by means of an nonaqueous solution of a chromium compound such as tertiary butyl chromate to the xerogel, but preferably it is introduced by incorporating an aqueous solution of a water soluble chromium compound into the hydrogel after washing the hydrogel to remove alkali metal ions. Suitable chromium compounds include chromium acetate, chromium nitrate, chromium sulfate, chromium trioxide, ammonium chromate or any other chromium compound which can be converted to chromium oxide by calcination with at least part of the chromium being converted to the hexavalent state. As used herein, the term "chromium oxide", as used to describe the chromium compound present in the catalyst system after calcining, includes fixed surface chromates formed by the reaction of chromium oxide and silica, as discussed in Hogan, J. Poly. Sci. A-1, 8, 2637–2652 (1970). The chromium compound can be employed in any amount so as to provide the desired weight percent chromium in the final catalyst system.

The catalyst system can be activated by calcining at a temperature within the range of about 530° C. to about 650° C. in a dry atmosphere containing oxygen, usually dry air, for a time of about 10 minutes to 20 hours or longer. Activation can follow titanation of the catalyst system in the activator, as described above, by heating the fluidized catalyst system sample to about 316° C., substituting dry air for the nitrogen atmosphere present during titanation, raising the temperature to at least about 400° C., and calcining the fluidized catalyst system at this elevated temperature for any appropriate activation time. Following activation, the catalyst system must be stored in a dry, inert atmosphere until used.

Catalyst systems of this invention do not require a reduction step using carbon monoxide or other reducing treatments. In fact, such reduction treatments can be detrimental to this invention because they can narrow the molecular weight distribution and lower the density of the resin beyond that which is desirable for blow molding.

The resultant chromium on silica-titania catalyst system must be of a certain porosity. The pore volume of the resultant catalyst system preferably is within a range of about 0.6 to about 1.4 milliliters per gram and preferably within a range of about 0.7 to about 1.3 milliliters per gram. Most preferably, for best catalyst system activity and most improved polymer product properties, the pore volume of the catalyst system is within a range of 0.8 to 1.1 milliliters per gram. Higher pore volumes tend to give higher swell in the resin, and lower pore volumes destroy the activity of the catalyst system.

The surface area of the catalyst system must be within a range of about 100 $m^2$/gram to about 500 $m^2$/gram, preferably within a range of about 200 $m^2$/gram to about 400 $m^2$/gram. Most preferably, the surface area of the catalyst system, for best catalyst system productivity and best resultant polymer processing properties is within a range of 300 $m^2$/gram to 400 $m^2$/gram.

The resultant pore diameter is important because it can affect the amount of swell in the resin. As used here, the pore diameter is calculated by the equation: Pore diameter=4 (Pore Volume)/(Surface Area). The pore diameter must be from about 50 angstroms (Å) to about 150 Å, preferably between 60 Å and 140 Å, and most preferably between 70 Å and 120 Å.

Organoboron compounds used as promoters with the silica-titania chromium oxide catalyst systems of the invention can be expressed as $BR_3$, wherein each R is selected independently from hydrogen, alkyl, cycloalkyl and aryl, at least one R in each compound being a hydrocarbon radical having from 1 to 12 carbon atoms, with the total number of carbon atoms not exceeding 30 in each compound. Examples of suitable boron promoters include trimethylborane, triethylborane, tri-n-dodecylborane, tricyclohexylborane, tri(2-methylcyclopentyl)borane, triphenylborane, tribenzylborane, tri(2-ethylphenyl)borane, methyldiethylborane, and like compounds. Boron compounds such as diborane which can form an organoboron compound in-situ, on contact with the olefin monomer(s), also are suitable. Trialkylboranes presently are preferred because of their availability.

The amount of boron compound used is generally within a range of about 0.1 to about 10 weight percent, based on the weight of the calcined catalyst system fed to the polymerization reactor. In a continuous particle form process using a loop reactor, for example, it is convenient to introduce the organoboron compound as a separate stream into the reactor, either continuously or in pulses, as a dilute solution in an inert hydrocarbon, e.g., 0.1 weight percent in isobutane. The concentration of the organoboron compound also can be expressed in parts per million (ppm) based on the diluent used in the polymerization reactor. Weight percent ranges of organoboron compounds should be from about 0.1ppm to about 2 ppm organoboron compound, based on the amount of diluent charged in a continuous particle form process using a loop reactor. Preferably it should be from 0.3 ppm to 1.5 ppm, and most preferably it should be from 0.8 ppm to 1.3 ppm. Higher levels of the boron compound can generate more volatile components, and lower amounts do not give sufficiently high ESCR.

Reactants

Polymers produced in accordance with the process of this invention are homopolymers of ethylene and copolymers of ethylene and higher alpha-olefin comonomers. Preferably, the ethylene concentration in the polymerization reactor is within a range of from about 2 weight percent to about 20 weight percent, based on the total liquid content of the reactor. Most preferably, the ethylene concentration in the polymerization reactor is within a range of from about 4 to about 15 weight percent. Measured in another manner, ethylene concentration in the polymerization reactor flash gas is within a range of from about 2 weight percent to about 12 weight percent. Most preferably, the ethylene concentration in the polymerization reactor flash gas is within a range of from about 3 to about 8 weight percent. Ethylene concentration in the reactor can significantly affect the molecular weight of the resultant polymer and also catalyst system activity.

Alpha-olefin comonomers used in the present invention must be selected from the group consisting of 1-butene, 1-hexene, and mixtures thereof in order to produce a copolymer with desirable properties as well as ease of use in a loop/slurry polymerization reaction process. The most preferred comonomer is 1-hexene to produce a copolymer with the best product properties. If a comonomer is present during polymerization, the comonomer concentration in the polymerization reactor is within a range of from about 0.1 to about 10 weight percent. Most preferably, comonomer is present within a range of about 0.2 to about 2 weight percent.

Polymerization Process

Polymerization of the olefin monomer(s) must be carried out under loop/slurry polymerization conditions wherein the temperature is kept below the temperature at which polymer swells. Such polymerization techniques are well known in the art and are disclosed, for instance, in Norwood, U.S. Pat. No. 3,248,179, the disclosure of which is herein incorporated by reference. A light diluent, loop polymerization process is much more preferred than a stirred tank reactor because a stirred tank cannot contain isobutane, which is necessary to produce other commercially popular high density polyethylene polymer product grades. A loop reactor also has an advantage in that isobutane diluent can be flashed off during polymer recovery, eliminating the necessity of separating polymer product from solvent. Additionally, the greater heat transfer surface of a loop reactor offers much more versatility for plant operation, and often less polymer swelling during polymerization.

Polymerization reaction temperature in the reactor, or reaction zone, according to this invention, is critical and is dependant on the type of catalyst system employed. Polymerization reaction temperatures usually must be within a range of about 200° F. to about 230° F. (93° C. to 110° C.), preferably within a range of about 210° F. to about 225° F. (99° C. to 107° C.). Most preferably, the reaction zone temperature is within a range of 210° F. to 220° F. (99° C. to 104° C.). Too high of a reactor temperature can produce a polymer with too low of a molecular weight; or even to a fouled reactor. Too low of a reactor temperature can make the polymerization process inoperable because a lower reactor temperature can be difficult to maintain due to the exothermic polymerization reaction, flashing off reactor diluent can be difficult, and can produce a polymer with a commercially unacceptably high molecular weight.

Products

Polymers produced in accordance with this invention are homopolymers of ethylene and copolymers of ethylene and higher alpha-olefin comonomers. Polymers produced according to this invention are much more easily processed than polymers produced in accordance with different polymerization processes. The high load melt index (HLMI) usually is within a range of about 5 g/10 mins to about 25 g/10 mins, preferably within a range of about 8 g/10 mins to about 20 g/10 minutes. Most preferably, the HLMI of the polymer product is within a range of 10 g/10 mins to 16 g/10 mins. The HLMI/MI ratio of polymers produced in accordance with this invention is relatively high and usually is within a range of about 100 to about 250, preferably within a range of about 140 to about 230; most preferably the HLMI/MI ratio is within a range of 160 to 200.

These polymers also have a broad molecular weight distribution as evidenced by $M_w/M_n$. Usually the $M_w/M_n$ ratio is within a range of about 15 to about 30, preferably within a range of about 15 to about 26. Most preferably the $M_w/M_n$ ratio is within a range of 18 to 23. These polymers also have a very narrow density range, usually within a range of about 0.950 g/cc to about 0.960 g/cc. Preferably the density is within a range of about 0.952 g/cc to about 0.958 g/cc and most preferably the density is within a range of 0.953 g/cc to 0.957 g/cc.

Polymers produced in accordance with this invention also have a very high environmental stress crack resistance (ESCR). Generally, under Condition A, the ESCR is greater than about 400 hours, preferably greater than about 500 hours and most preferably the ESCR, condition A is greater than 600 hours. The modified Condition B ESCR usually is greater than about 50 hours, preferably greater than about 65 hours, and most preferably greater than 80 hours.

Polymers of this invention also have excellent processing characteristics, as indicated by a high shear rate at the onset of melt fracture. The shear rate at onset of melt fracture is at least about 2000 sec$^{-1}$, preferably greater than about 2100 sec$^{-1}$, and most preferably greater than 2200 sec$^{-1}$. Polymers of this invention also have high output rates from a blow molding machine, at least 1200 grams per minute (g/min), preferably greater than 1300 g/min, and most preferably greater than 1350 g/min.

Polymers of this invention are characterized as having low swell characteristics, too. They usually exhibit less than about 42% diameter swell, preferably less than about 39%, and most preferably less than 35%. The weight swell of polymers of this invention usually is less than about 380%, preferably less than about 350%, and most preferably less than 330%.

Polymers of this invention also are characterized as having a low volatile content, or smoke content. This means that they should contain less than 2% of their weight as oligomeric components having less than 1000 molecular weight. Preferably, these polymers comprise less than about 1.6 weight % below 1000 MW, and most preferably these polymers comprise less than 1.4% material below 1000 in molecular weight. These polymers should also contain less than about 0.7% xylene solubles, preferably less than about 0.65%, and most preferably less than 0.6 % xylene solubles.

The following examples are provided to further assist a person skilled in the art with understanding the invention. The particular reactants, conditions, and other variables are intended to be generally illustrative of these inventions and are not meant to be construed to the unduly limiting the reasonable scope of the invention.

EXAMPLES

Catalyst systems used for the production of the inventive resins 17–21 and control resin 22, were based on low porosity Cr/silica-titania commercially available from W.R. Grace Company as 965 Sylopore®. It contained 2.5 weight percent titanium as titania and originally 1.0 weight percent chromium. Sylopore® has a pore volume of about 1.0 cc/g and a surface area of usually about 380 m$^2$/g. Specific measurements may be shown in the Tables that follow. In some Runs, both inventive Runs and control Runs, extra chromium was added through impregnation of a 0.5% methanol solution of chromium nitrate, as indicated in the Tables.

Control resins were made from several other types of commercial catalyst systems commercially available from W.R. Grace. The catalyst 969MS (sometimes also referred to as 1% Cr on Grade 952 silica), used for Runs 1–10, had a pore volume of about 1.6 cc/g and a surface area around 300 m$^2$/g.

Run 11 was made using a HA30 support, from W.R.Grace, having the properties listed in the Tables.

Runs 12–14, were made by a catalyst system described as chromium on HPVSA silica. This silica also was made by W.R. Grace and had a surface area of about 580 m$_2$/g and a pore volume of about 2.2 cc/g.

Another silica support used in Runs 15 and 16, labeled HPV, had a pore volume of 2.5 cc/g and a surface area of 300 m$^2$/g.

Some polymers, or resins, were made from 964 Magnapore®, Runs 23–34, and 963 Magnapore®, Runs 35–48, and which contained 1.0, 2.0 or 3.0 weight percent chromium on a high porosity silica-titania and either 2.5 or 5.0 weight percent titanium, as indicated. 964 Magnapore® has a pore volume of 2.3 cc/g and a surface area of 540 m$^2$/g.

963 Magnapore® has a pore volume of 2.6 cc/g and a surface area of 520 m$^2$/g.

The catalyst system used in Runs 49–61 was similar to 963 Magnapore®, but had only one (1) weight percent titania in the support.

Another catalyst system was used in Runs 62–64 and was prepared by W.R.Grace by depositing aluminophosphate (P/Al molar ratio of 0.6) into the pores of silica. This material had a pore volume of 1.3 cc/g and a surface area of 250 m$^2$/g.

Ethylene polymers were prepared using these catalyst systems in a continuous particle form process (also known as a slurry loop process) by contacting a catalyst system with a ethylene and 1-hexene. The medium (diluent) and temperature thus were selected such that the copolymer was produced as solid particles and is recovered in that form. Ethylene that had been dried over activated alumina was used as the monomer.

The reactor was a liquid full 15.2 cm diameter pipe loop having a volume of 23 gallons (87 liters). Liquid isobutane, degassed by fractionation and dried over alumina, was used as the diluent, and occasionally some hydrogen was added to regulate the molecular weight of the polymer product. The reactor pressure was about 3.8 MPa (about 580 psi). The reactor temperature was varied over the range of 180° F. to 230° F. (82° C. to 110° C.), as indicated in the Tables below. The reactor was operated to have a residence time of 1.25 hours. Catalyst system was added through a 0.35 cc circulating ball-check feeder. At steady state conditions, the isobutane feed rate was about 46 liters per hour, the ethylene feed rate was about 30 lbs/hr, and the 1-hexene feed rate was varied to control the density of the polymer product. Catalyst system concentrations in the reactor can be such that the catalyst system content ranges from 0.001 to about 1 weight percent, based on the weight of the reactor contents. Polymer was removed from the reactor at a rate of about 25 lbs per hour and recovered in a flash chamber. A Vulcan dryer was used to dry the polymer under nitrogen at about 60° C. to about 80° C.

Cocatalysts triethylaluminum (TEA) and triethylboron (TEB) sometimes were added, as indicated in the Table below. To prevent static buildup in the reactor, a small amount (<5 ppm of diluent) of a commercial antistatic agent sold as Stadis 450 was usually added.

Density (g/ml): ASTM D 1505–68 and ASTM D 1928, Condition C. Determined on a compression molded sample, cooled at about 15 C per minute, and conditioned at room temperature for about 40 hours.

High Load Melt Index (HLMI)(g/10 min): ASTM D1238, condition E. Determined at 190 C with a 21,600 gram weight.

Molecular Weight Distribution $M_w/M_n$: Molecular weights and molecular weight distributions were obtained using a Waters 150 CV gel permeation chromatograph with trichlorobenzene (TCB) as the solvent, with a flow rate of 1 mL/minute at a temperature of 140 C. BHT (2,6-di-tert-butyl-4-methylphenol) at a concentration of 1.0 g/L was used as a stabilizer in the TCB. An injection volume of 220 L was used with a nominal polymer concentration of 0.3 g/l (at room temperature). Dissolution of the sample in stabilized TCB was carried out by heating at 160–170 C for 20 hours with occasional, gentle agitation. The column was two Waters HT-6E columns (7.8×300 mm). The columns were calibrated with a broad linear polyethylene standard (Phillips Marlex® BHB 5003) for which the molecular weight had been determined. As a measure of volatile oligomeric components, or smoke, the amount of material found in the range of molecular weights from 100 to 1000 are listed in the table below.

Xylene solubles (%): ASTM D5494-94. A measurement of the amount of low molecular weight oligomers and thus, of the potential of the resin to smoke during processing.

A "Quantachrome Autosorb-6 Nitrogen Pore Size Distribution Instrument" was used to determined the surface area and pore volume of the supports. This instrument was acquired from the Quantachrome Corporation, Syosset, N.Y.

Polymer resins obtained by this invention are useful for blow molding applications. In these examples blow molding evaluations were conducted by blowing a one gallon (105.0+ 0.5 gm) bottle on a Uniloy 2016 single head blow molding machine using a 2.5 inch diameter die, 20 degree diverging die, 32% accumulator position, 8.5 second blow time, 0.10 second blow delay, 0.75 second pre-blow delay and a 45° F. mold temperature. A reciprocating screw speed of 45 rpm was used, providing parison extrusion at shear rates greater than $10,000/sec^{-1}$ through the die.

Three measurements of polymer processability during blow molding were determined in the following three tests:

1-Minute Output: Describes the speed at which one part of the blow molding operation was accomplished. For this test, the extruder on the blow molding machine was set at 45 rpm and it was allowed to extrude resin for one full minute at the same die gap used to make the desired bottles. After 1 minute, the test was stopped and extruded polymer was weighed to determine the 1-minute output value. This value provides an indication of the rate of extrusion of the polymer during the blow molding operation.

Processing Rating: A subjective rating given by the machine operator based on their unbiased observations during the test. Each resin was given a rating of from 1 to 5, with 5 being the worts and 1 being the best. The operator considered such factors as head pressure, temperature, cycle time, pinch-off, and difficulties trimming.

Shear Rate at Melt Fracture. The onset of melt fracture of each resin was evaluated on the same Uniloy machine used in the previous two tests, by opening the die gap and extruding the resin. Shear rate was increased steadily by increasing the screw rpm. Onset of melt fracture was the rpm at which the parison showed visible signs of melt fracture, such as a shark skin appearance or a distorted rippled surface.

Percent Weight Swell: Measures the amount the molten resin expands immediately as the resin exits the die. Percent weight swell is a measure of the "memory" of polymer chains as the chains seek to relax and reform the original polymer shape. Weight swell is important because it measures how tightly the die gap must be adjusted to provide a constant bottle weight. If a resin has high weight swell, the die gap required will be tighter to make the proper part weight. In so doing, higher stress will be required to push the resin through the die than a lower weight swell resin. Weight swell is defined as the ratio of the die gap to the final bottle wall thickness.

Diameter Swell (Die Swell): The ratio of the parison diameter to the die diameter.

Example 1

A total of 64 polymers were produced for this test in accordance with the above procedures. Information about the catalyst system, the polymerization reaction, and evaluation of the polymers are listed in Table 1 below.

Only the unique combination of catalyst system properties (pore diameter, activation temperature, Ti and Cr level) and reactor properties (TEB level) yields a polymer that is especially well suited to the desired blow molding operations. This is evidenced by the high level of ESCR, good processing characteristics (as indicated by the 1-minute output test, operator evaluations, and the shear at onset of melt fracture), and low volatile or smoke content (as indicated by the xylene solubles test, the amount of material found in the GPC molecular weight decade of $10^{2-10^3}$, i.e., less than 1000 molecular weight, and by the subjective odor rating given by the machine operator (5=worst, 1=best).

TABLE 1

| | Catalyst Characteristics | | | | | |
|---|---|---|---|---|---|---|
| Run Number | Support | Weight Percent Chromium | Weight Percent Titanium | Pore Volume cc/g | Surface Area $m^2/g$ | Pore Radius Å |
| 1 | Silica | 0.6 | 0.0 | 1.6 | 300 | 213 |
| 2 | Silica | 0.6 | 0.0 | 1.6 | 300 | 213 |
| 3 | Silica | 1.0 | 0.0 | 1.6 | 300 | 213 |
| 4 | Silica | 1.0 | 0.0 | 1.6 | 300 | 213 |
| 5 | Silica | 1.0 | 0.0 | 1.6 | 300 | 213 |
| 6 | Silica | 1.0 | 0.0 | 1.6 | 300 | 213 |
| 7 | Silica | 1.0 | 0.0 | 1.6 | 300 | 213 |
| 8 | Silica | 1.0 | 0.0 | 1.6 | 300 | 213 |
| 9 | Silica | 1.0 | 0.0 | 1.6 | 300 | 213 |
| 10 | Silica | 1.0 | 0.0 | 1.6 | 300 | 213 |
| 11 | Silica | 1.0 | 0.0 | 1.6 | 500 | 128 |
| 12 | Silica | 1.0 | 0.0 | 2.2 | 577 | 153 |
| 13 | Silica | 1.0 | 0.0 | 2.2 | 577 | 153 |
| 14 | Silica | 1.0 | 0.0 | 2.2 | 577 | 153 |
| 15 | Silica | 1.0 | 0.0 | 2.5 | 300 | 333 |
| 16 | Silica | 1.0 | 0.0 | 2.5 | 300 | 333 |
| 17 | Silica-Titania | 1.0 | 2.5 | 1.0 | 380 | 105 |
| 18 | Silica-Titania | 1.0 | 2.5 | 1.0 | 380 | 105 |
| 19 | Silica-Titania | 1.0 | 2.5 | 1.0 | 380 | 105 |
| 20 | Silica-Titania | 1.0 | 2.5 | 1.0 | 380 | 105 |
| 21 | Silica-Titania | 1.0 | 2.5 | 1.0 | 380 | 105 |

TABLE 1-continued

Catalyst Characteristics

| Run Number | Support | Weight Percent Chromium | Weight Percent Titanium | Pore Volume cc/g | Surface Area m²/g | Pore Radius Å |
|---|---|---|---|---|---|---|
| 22 | Silica-Titania | 2.0 | 2.5 | 1.0 | 380 | 105 |
| 23 | Silica-Titania | 1.0 | 5.0 | 2.3 | 540 | 170 |
| 24 | Silica-Titania | 1.0 | 5.0 | 2.3 | 540 | 170 |
| 25 | Silica-Titania | 2.0 | 5.0 | 2.3 | 540 | 170 |
| 26 | Silica-Titania | 2.0 | 5.0 | 2.3 | 540 | 170 |
| 27 | Silica-Titania | 2.0 | 5.0 | 2.3 | 540 | 170 |
| 28 | Silica-Titania | 2.0 | 5.0 | 2.3 | 540 | 170 |
| 29 | Silica-Titania | 2.0 | 5.0 | 2.3 | 540 | 170 |
| 30 | Silica-Titania | 2.0 | 5.0 | 2.3 | 540 | 170 |
| 31 | Silica-Titania | 2.0 | 5.0 | 2.3 | 540 | 170 |
| 32 | Silica-Titania | 3.0 | 5.0 | 2.3 | 540 | 170 |
| 33 | Silica-Titania | 3.0 | 5.0 | 2.3 | 540 | 170 |
| 34 | Silica-Titania | 3.0 | 5.0 | 2.3 | 540 | 170 |
| 35 | Silica-Titania | 2.0 | 2.5 | 2.6 | 520 | 200 |
| 36 | Silica-Titania | 2.0 | 2.5 | 2.6 | 520 | 200 |
| 37 | Silica-Titania | 2.0 | 2.5 | 2.6 | 520 | 200 |
| 38 | Silica-Titania | 2.0 | 2.5 | 2.6 | 520 | 200 |
| 39 | Silica-Titania | 2.0 | 2.5 | 2.6 | 520 | 200 |
| 40 | Silica-Titania | 2.0 | 2.5 | 2.6 | 520 | 200 |
| 41 | Silica-Titania | 2.0 | 2.5 | 2.6 | 520 | 200 |
| 42 | Silica-Titania | 2.0 | 2.5 | 2.6 | 520 | 200 |
| 43 | Silica-Titania | 2.0 | 2.5 | 2.6 | 520 | 200 |
| 44 | Silica-Titania | 2.0 | 2.5 | 2.6 | 520 | 200 |
| 45 | Silica-Titania | 2.0 | 2.5 | 2.6 | 520 | 200 |
| 46 | Silica-Titania | 2.0 | 2.5 | 2.6 | 520 | 200 |
| 47 | Silica-Titania | 2.0 | 2.5 | 2.6 | 520 | 200 |
| 48 | Silica-Titania | 2.0 | 2.5 | 2.6 | 520 | 200 |
| 49 | Silica-Titania | 2.0 | 1.0 | 2.6 | 535 | 194 |
| 50 | Silica-Titania | 2.0 | 1.0 | 2.6 | 535 | 194 |
| 51 | Silica-Titania | 2.0 | 1.0 | 2.6 | 535 | 194 |
| 52 | Silica-Titania | 2.0 | 1.0 | 2.6 | 535 | 194 |
| 53 | Silica-Titania | 2.0 | 1.0 | 2.6 | 535 | 194 |
| 54 | Silica-Titania | 2.0 | 1.0 | 2.6 | 535 | 194 |
| 55 | Silica-Titania | 2.0 | 1.0 | 2.6 | 535 | 194 |
| 56 | Silica-Titania | 2.0 | 1.0 | 2.6 | 535 | 194 |
| 57 | Silica-Titania | 2.0 | 1.0 | 2.6 | 535 | 194 |
| 58 | Silica-Titania | 2.0 | 1.0 | 2.6 | 535 | 194 |
| 59 | Silica-Titania | 2.0 | 1.0 | 2.6 | 535 | 194 |
| 60 | Silica-Titania | 2.0 | 1.0 | 2.6 | 535 | 194 |
| 61 | Silica-Titania | 2.0 | 1.0 | 2.6 | 535 | 194 |
| 62 | Silica-AlPO4 | 1.0 | 0.0 | 1.3 | 250 | 208 |
| 63 | Silica-AlPO4 | 1.0 | 0.0 | 1.3 | 250 | 208 |
| 64 | Silica-AlPO4 | 1.0 | 0.0 | 1.3 | 250 | 208 |

TABLE 2

| | Reaction Conditions | | | | Polymer Properties | | | | |
|---|---|---|---|---|---|---|---|---|---|
| | Calcining | Reactor | | | | | | | |
| Run Number | Temp. °F. | Temp. °F. | Cocat. Type | Conc ppm | MI g/10 min | HLMI g/10 min | HLMI/MI | density g/mL | $M_w/M_n$ |
| 1 | 1300 | 220 | TEB | 2.23 | 0.01 | 7.9 | 794 | 0.9526 | 16.8 |
| 2 | 1300 | 221 | TEB | 1.77 | 0.02 | 9.0 | 452 | 0.9547 | 13.1 |
| 3 | 1450 | 214 | None | ND | 0.30 | 30.0 | 100 | 0.9533 | 8.4 |
| 4 | 1450 | 217 | None | ND | 0.41 | 37.6 | 91.6 | 0.9540 | 10.4 |
| 5 | 1450 | 218 | None | ND | 0.31 | 31.5 | 102 | 0.9551 | 7.9 |
| 6 | 1200 | 217 | TEB | 2.0 | 0.06 | 8.9 | 148 | 0.9545 | 16.4 |
| 7 | 1200 | 220 | TEB | 2.0 | 0.05 | 11.8 | 236 | 0.9544 | 14.9 |
| 8 | 1200 | 220 | TEB | 2.0 | 0.06 | 13.6 | 220 | 0.9546 | 14.4 |
| 9 | 1300 | 222 | TEB | 1.0 | 0.07 | 11.4 | 1637 | 0.9536 | 8.4 |
| 10 | 1300 | 222 | TEB | 1.0 | 0.09 | 14.3 | 159 | 0.9537 | 8.4 |
| 11 | 1300 | 218 | TEB | 2.08 | 0.01 | 10.2 | 1040 | 0.9524 | 11.4 |
| 12 | 1000 | 218 | TEB | 2.0 | 0.15 | 20.7 | 138 | 0.9539 | 17.5 |
| 13 | 1000 | 217 | TEB | 2.0 | 0.14 | 19.3 | 138 | 0.9541 | 14.4 |
| 14 | 1000 | 220 | TEB | 2.13 | 0.02 | 10.7 | 536 | 0.9539 | 20.0 |
| 15 | 1200 | 217 | TEB | 2.0 | 0.06 | 12.4 | 207 | 0.9546 | 15.2 |
| 16 | 1200 | 218 | TEB | 2.0 | 0.10 | 15.7 | 157 | 0.9544 | 14.2 |
| 17 | 1100 | 211 | TEB | 1.0 | 0.14 | 19.8 | 141 | 0.9512 | 235 |

TABLE 2-continued

| | Reaction Conditions | | | | Polymer Properties | | | | |
|---|---|---|---|---|---|---|---|---|---|
| | Calcining | Reactor | | | | | | | |
| Run Number | Temp. °F. | Temp. °F. | Cocat. Type | Conc ppm | MI g/10 min | HLMI g/10 min | HLMI/MI | density g/mL | $M_w/M_n$ |
| 18 | 1100 | 213 | TEB | 1.0 | 0.06 | 11.1 | 184 | 0.9532 | 19.4 |
| 19 | 1100 | 214 | TEB | 1.0 | 0.07 | 12.8 | 182 | 0.9545 | 21.5 |
| 20 | 1100 | 216 | TEB | 1.0 | 0.07 | 12.5 | 178 | 0.9530 | 17.2 |
| 21 | 1100 | 218 | TEB | 1.0 | 0.05 | 11.5 | 230 | 0.9540 | 23.0 |
| 22 | 1100 | 216 | TEB | 2.0 | 0.09 | 19.4 | 216 | 0.9552 | 24.1 |
| 23 | 1000 | 210 | TEB | 2.0 | 0.17 | 28.7 | 169 | 0.9562 | 32.2 |
| 24 | 1000 | 204 | TEB | 2.0 | 0.09 | 17.2 | 191 | 0.9567 | 38.8 |
| 25 | 1100 | 216 | TEA | 2.0 | 0.12 | 16.7 | 139 | 0.9545 | 30.2 |
| 26 | 1100 | 195 | TEB | 2.0 | 0.06 | 14.9 | 248 | 0.9545 | 41.9 |
| 27 | 1100 | 203 | TEB | 2.0 | 0.18 | 32.5 | 180 | 0.9560 | ND |
| 28 | 1100 | 203 | TEB | 2.0 | 0.15 | 27.4 | 183 | 0.9565 | 29.0 |
| 29 | 1100 | 193 | TEB | 2.0 | 0.05 | 13.1 | 263 | 0.9544 | 35.1 |
| 30 | 1000 | 203 | TEB | 2.0 | 0.11 | 21.0 | 191 | 0.9554 | 38.1 |
| 31 | 1000 | 203 | TEB | 2.0 | 0.04 | 12.8 | 320 | 0.9581 | 37.2 |
| 32 | 1000 | 199 | TEB | 2.0 | 0.08 | 17.8 | 222 | 0.9552 | 37.2 |
| 33 | 1000 | 205 | TEB | 4.0 | 0.13 | 27.1 | 208 | 0.9561 | 35.6 |
| 34 | 1000 | 197 | TEB | 4.0 | 0.06 | 17.4 | 291 | 0.9564 | 43.9 |
| 35 | 1000 | 211 | TEB | 2.0 | 0.13 | 21.7 | 167 | 0.9544 | 25.6 |
| 36 | 1000 | 210 | TEB | 2.0 | 0.11 | 19.2 | 174 | 0.9545 | 24.7 |
| 37 | 1100 | 219 | None | ND | 0.23 | 20.1 | 87.2 | 0.9586 | 12.6 |
| 38 | 1100 | 219 | None | ND | 0.32 | 23.6 | 73.8 | 0.9587 | 13.2 |
| 39 | 1100 | 219 | None | ND | 0.34 | 26.7 | 78.5 | 0.957 | 14.0 |
| 40 | 1100 | 218 | TEA | 2.0 | 0.11 | 12.5 | 113 | 0.9530 | 22.8 |
| 41 | 1100 | 219 | TEA | 2.0 | 0.15 | 17.0 | 113 | 0.9533 | 24.0 |
| 42 | 1100 | 208 | TEB | 2.0 | 0.09 | 17.2 | 191 | 0.9559 | 21.4 |
| 43 | 1100 | 219 | TEB/A | 2.0/0.5 | 0.19 | 25.4 | 134 | 0.9587 | 21.2 |
| 44 | 1100 | 219 | TEB/A | 1.4/0.3 | 0.21 | 26.4 | 126 | 0.9585 | 21.0 |
| 45 | 1100 | 219 | TEB/A | 1.9/0.5 | 0.22 | 24.8 | 113 | 0.9549 | 21.6 |
| 46 | 1100 | 219 | TEB/A | 2.3/2.3 | 0.15 | 21.8 | 146 | 0.9547 | 22.7 |
| 47 | 1100 | 219 | TEB/A | 2.0/2.0 | 0.35 | 33.5 | 95.7 | 0.9492 | 21.2 |
| 48 | 1200 | 206 | TEB | 2.05 | 0.05 | 12.5 | 250 | 0.9537 | 23.4 |
| 49 | 1100 | 220 | TEB | 1.83 | 0.04 | 11.9 | 299 | 0.9577 | 23.7 |
| 50 | 1100 | 219 | TEB | 1.94 | 0.07 | 15.2 | 217 | 0.9557 | 19.8 |
| 51 | 1100 | 219 | TEB | 1.89 | 0.06 | 13.7 | 228 | 0.9545 | 18.8 |
| 52 | 1200 | 220 | TEB | 2 | 0.12 | 19.7 | 164 | 0.956 | 22.8 |
| 53 | 1200 | 220 | TEB | 2.1 | 0.15 | 22.6 | 151 | 0.9569 | 20.8 |
| 54 | 1200 | 220 | TEB | 1.9 | 0.2 | 24.2 | 121 | 0.9562 | 17.5 |
| 55 | 1200 | 220 | TEB | 1.9 | 0.21 | 26.9 | 128 | 0.9569 | 18.5 |
| 56 | 1200 | 220 | TEB | 1.9 | 0.2 | 25.7 | 129 | 0.9568 | 18.1 |
| 57 | 1200 | 220 | TEB | 2.1 | 0.19 | 24.9 | 131 | 0.9586 | 18.5 |
| 58 | 1200 | 220 | TEB | 2.1 | 0.16 | 22.8 | 142 | 0.9586 | 18.7 |
| 59 | 1200 | 218 | TEB | 2.02 | 0.07 | 14.3 | 204 | 0.9526 | 20.3 |
| 60 | 1200 | 220 | TEB | 1.96 | 0.02 | 10.8 | 540 | 0.9533 | 20.4 |
| 61 | 1200 | 213 | TEB | 2.01 | 0.02 | 10.3 | 514 | 0.9545 | 22.9 |
| 62 | 1300 | 212 | TEB | 1.94 | 0.08 | 18.2 | 228 | 0.9574 | 17.9 |
| 63 | 1300 | 214 | TEB | 2.15 | 0.04 | 13.7 | 342 | 0.9567 | 21.7 |
| 64 | 1300 | 219 | TEB | 1.84 | 0.1 | 21.9 | 219 | 0.9552 | 15.1 |

Note: TEB is Triethylboron; TFA is triethyl aluminum; and TEB/A is a combination of triethylboron and triethyl aluminum.

TABLE 3

| | | | | | Processing Character | | | Volatiles | |
|---|---|---|---|---|---|---|---|---|---|
| | ESCR | | Swell | | Melt | | | | Wt % in MW |
| Run Number | Cond. A hours | Cond. mod B hours | Die Swell % | Weight Swell % | Process Rating 1 to 5 | Fract. Shear Rate | 1 min output @7% g | Odor Rating 1 to 5 | Xylene Solubles % | Decade $10^2$–$10^3$ (<1000 MW) |
| 1 | 104 | 48 | 30.4 | 246 | 3 | 1240 | 743 | 3 | 0.08 | 0.73 |
| 2 | 90 | 48 | 31.7 | 247 | 3 | 1250 | 752 | 3 | 0.12 | 0.61 |
| 3 | 115 | 115 | 42.9 | 399 | 2 | 1930 | ND | 3 | 0.22 | 0.00 |
| 4 | 42 | <24 | 44.6 | 445 | 2 | 2440 | 1465 | 3 | 0.80 | 0.35 |
| 5 | 64 | <24 | 46.7 | 405 | 2 | 2420 | 1454 | 2 | 0.12 | 0.33 |
| 6 | 361 | 82 | 32.4 | 312 | 2 | 2290 | 1378 | 2 | ND | 0.69 |
| 7 | 196 | 56 | 34.2 | 314 | 2 | 2350 | 1412 | 2 | ND | 0.81 |
| 8 | 234 | 44 | 38.0 | 314 | 2 | 2270 | 1364 | 2 | ND | 0.45 |
| 9 | 71 | 39 | 29.9 | 259 | 2 | 1440 | 865 | 2 | 0.20 | 0.01 |

TABLE 3-continued

| | | | | | Processing Character | | | Volatiles | | |
| | ESCR | | Swell | | Melt | | | | | Wt % in MW |
| Run Number | Cond. A hours | Cond. mod B hours | Die Swell % | Weight Swell % | Process Rating 1 to 5 | Fract. Shear Rate | 1 min output @7% g | Odor Rating 1 to 5 | Xylene Solubles % | Decade $10^2$–$10^3$ (<1000 MW) |
|---|---|---|---|---|---|---|---|---|---|---|
| 10 | 60 | 37 | 30.4 | 263 | 2 | 1920 | 1154 | 2 | 0.08 | 0.01 |
| 11 | 408 | 139 | 36.7 | 293 | 2 | 1260 | 756 | 3 | 0.20 | 0.44 |
| 12 | 395 | 90 | 42.3 | 401 | 2 | 2460 | 1476 | 2 | ND | 0.94 |
| 13 | 395 | 73 | 45.4 | 375 | 2 | 2240 | 1348 | 2 | ND | 0.62 |
| 14 | >1000 | 185 | 41.8 | 316 | 3 | 735 | 442 | 2 | 0.58 | 0.55 |
| 15 | 316 | 54 | 35.0 | 334 | 2 | 2370 | 1424 | 2 | ND | 0.65 |
| 16 | 248 | 61 | 41.3 | 349 | 2 | 2440 | 1465 | 2 | ND | 0.51 |
| 17 | >1000 | 411 | 42.3 | 368 | 3 | 2350 | 1412 | 2 | 0.56 | 1.54 |
| 18 | >1000 | 127 | 36.7 | 321 | 2 | 2300 | 1382 | 2 | 0.56 | 1.29 |
| 19 | 594 | 104 | 37.3 | 328 | 2 | 2310 | 1391 | 2 | 0.64 | 1.04 |
| 20 | 726 | 87 | 36.5 | 327 | 2 | 2350 | 1413 | 2 | 0.52 | 1.19 |
| 21 | 428 | 87 | 39.0 | 313 | 2 | 2230 | 1339 | 2 | 0.48 | 1.61 |
| 22 | 283 | 115 | 34.5 | 290 | 3 | 2360 | ND | 5 | 1.29 | 1.27 |
| 23 | >1000 | 233 | 43.9 | 399 | 4 | 2290 | ND | 4 | 0.99 | 2.05 |
| 24 | >1000 | 429 | 42.6 | 395 | 4 | 2200 | ND | 4 | 1.07 | 2.44 |
| 25 | 304 | 102 | 44.1 | 330 | 3 | 1620 | 976 | 3 | 0.75 | 2.83 |
| 26 | >1000 | 170 | 43.9 | 434 | 4 | 2200 | 1321 | 3 | 1.12 | 3.73 |
| 27 | >1000 | 86 | 39.3 | 450 | 3 | 2260 | 1359 | 3 | 1.59 | ND |
| 28 | 414 | 75 | 39.0 | 402 | 4 | 2320 | 1393 | 3 | 0.99 | 2.14 |
| 29 | >1000 | 226 | 37.3 | 485 | 5 | 2170 | 1304 | 3 | 1.28 | 2.67 |
| 30 | >1000 | 317 | 40.1 | 392 | 5 | 2160 | ND | 5 | 0.80 | 2.34 |
| 31 | >1000 | 257 | 40.1 | 397 | 5 | 2210 | ND | 5 | 1.21 | 2.60 |
| 32 | >1000 | 300 | 38.0 | 410 | 5 | 2190 | ND | 5 | 1.20 | 2.42 |
| 33 | >1000 | 139 | 40.6 | 475 | 5 | 2180 | ND | 5 | 1.37 | 2.40 |
| 34 | >1000 | 261 | 40.1 | 457 | 5 | 2170 | ND | 5 | 1.10 | 2.92 |
| 35 | >1000 | 329 | 42.3 | 455 | 2 | 2260 | 1362 | 2 | 0.92 | 1.46 |
| 36 | >1000 | 241 | 46.4 | 436 | 3 | 2230 | 1339 | 3 | 0.96 | 1.97 |
| 37 | 209 | 45 | 51.0 | 353 | 3 | 1010 | 428 | 3 | 0.28 | 0.00 |
| 38 | 202 | 45 | 52.0 | 379 | 3 | N/A | 493 | 3 | 0.32 | 0.14 |
| 39 | 271 | 45 | 53.0 | 403 | 3 | N/A | 570 | 3 | 0.24 | 0.29 |
| 40 | 534 | 125 | 43.4 | 321 | 2 | 1110 | 669 | 2 | 0.56 | 1.53 |
| 41 | 400 | 85 | 45.1 | 325 | 2 | 1030 | 620 | 2 | 0.60 | 1.22 |
| 42 | >1000 | 144 | 44.9 | 414 | 3 | 2230 | 1343 | 3 | 0.80 | 1.43 |
| 43 | 485 | 69 | 47.0 | 459 | 3 | 1870 | 1378 | 2 | 1.04 | 0.37 |
| 44 | 417 | 61 | 48.0 | 489 | 3 | 1890 | 1442 | 2 | 0.64 | 0.44 |
| 45 | 637 | 90 | 47.0 | 407 | 3 | 1660 | 973 | 2 | 0.40 | 0.73 |
| 46 | 500 | 110 | 46.0 | 409 | 3 | 1500 | 915 | 3 | 0.20 | 0.85 |
| 47 | >1000 | 500 | 49.0 | 474 | 4 | 1640 | 1402 | 3 | 0.60 | 0.81 |
| 48 | >1000 | 180 | 40.3 | 386 | 2 | 2090 | 1257 | 3 | 0.92 | 1.58 |
| 49 | 258 | 120 | 43.1 | 332 | 2 | 848 | 510 | 3 | 0.68 | 1.38 |
| 50 | 441 | 120 | 42.9 | 338 | 2 | 1180 | 711 | 3 | 0.56 | 0.91 |
| 51 | 564 | 139 | 41.3 | 330 | 2 | 496 | 599 | 3 | 0.52 | 0.74 |
| 52 | 321 | 76 | 45.0 | 404 | 3 | 1560 | 1125 | 3 | 0.52 | 0.66 |
| 53 | 329 | 78 | 44.0 | 392 | 3 | 1680 | 1009 | 3 | 0.48 | 0.44 |
| 54 | 251 | 71 | 45.0 | 400 | 3 | 1910 | 991 | 3 | 0.60 | 0.33 |
| 55 | 373 | 56 | 45.0 | 429 | 3 | 1430 | 1182 | 3 | 0.76 | 0.49 |
| 56 | 378 | 69 | 46.0 | 412 | 3 | 1650 | 996 | 3 | 0.68 | 0.30 |
| 57 | 368 | 58 | 45.0 | 384 | 3 | 1640 | 948 | 3 | 0.64 | 0.31 |
| 58 | 346 | 56 | 46.0 | 389 | 3 | 1580 | 871 | 3 | 0.92 | 0.31 |
| 59 | 912 | 139 | 40.8 | 358 | 2 | 1820 | 1096 | 2 | 0.72 | 1.03 |
| 60 | 672 | 139 | 42.3 | 369 | 3 | 1490 | 898 | 2 | 0.40 | 1.08 |
| 61 | >1000 | 146 | 40.8 | 317 | 3 | 777 | 467 | 2 | 0.64 | 1.22 |
| 62 | 131 | 48 | 3517 | 332 | 2 | 2370 | 1425 | 2 | 0.52 | 1.09 |
| 63 | 131 | 48 | 35.2 | 322 | 2 | 2340 | 1410 | 2 | 0.66 | 1.38 |
| 64 | 112 | 48 | 36.7 | 326 | 2 | 2410 | 1451 | 3 | 0.68 | 0.89 |

By studying the data in Tables 1–3, it can be seen that ESCR is improved by high levels of TEB and Ti, which unfortunately also yields high volatiles or smoke. Swell is decreased by lowering the HLMI, which also makes processing more difficult, as indicated by lower values from the melt fracture and output tests. Swell is also decreased by increasing the activation temperature, but this also hurts ESCR. Notice also that the output test drops significantly if TEB is omitted, and the ESCR drops significantly if Ti is omitted. However, if TEB rises too much volatiles became a problem. Finally, notice also that swell becomes too high if the pore diameter increases much.

Thus the many opposing variables are uniquely balanced by the precise combination of conditions taught in this invention.

While this invention has been described in detail for the purpose of illustration, it is not to be construed as limited thereby but is intended to cover all changes and modifications within the spirit and scope thereof.

That which is claimed is:

1. A process for producing a copolymer of ethylene and 1-hexene wherein said copolymer has a high load melt index (HLMI) within the range of about 5 to about 25 g/10 minutes, a density in the range of about 0.95 to about 0.96 g/cc, a shear response (HLMI/MI) within the range of about 140 to about 230, an Mw/Mn of about 15 to about 30, a weight swell of less than about 380%, and a die swell of less than about 42%, an ESCR (Condition A) of greater than about 400 hours, an onset of melt fracture of at least about 2000 sec-1, and a 1-minute output test value of at least about 1200 grams per minute, xylene solubles of less than 0.7%, and less than 2.0 weight % material of molecular weight less than 1000, comprising contacting under slurry polymerization conditions in an isobutane diluent at a temperature of from about 200° F. to 230° F.

a) ethylene monomer;

b) 1-hexene, c) a catalyst comprising chromium supported on a silica-titania support, wherein said catalyst is prepared by coprecipitating the chromium with the silica and titania to produce a product which is aged twice, wherein the first aging is at a substantially neutral pH and wherein the second aging is at an alkaline pH, and wherein the catalyst contains about 0.8 to 1.5 weight percent chromium, said support comprises about 2.5 weight percent titanium, based on the weight on the support, wherein said catalyst has a surface area in the range of about 300 $m^2$/gm to about 500 $m^2$/gm, a pore volume in the range of about 0.8 to about 1.1 ml/gm, and said catalyst has been activated at a temperature within a range of about 538° C. to about 650° C.;

d) about 0.1 to about 2.0 mg/kg, based on the reactor diluent, of a trialkylboron compound; and e) recovering the copolymer.

2. A process according to claim 1 wherein the catalyst has a surface area of about 380 $m^2$/gm, a pore volume of about 1 cc/gm, about 1 weight percent chromium, and is activated at a temperature of about 1100° F.

3. A process according to claim 1 wherein said trialkylboron cocatalyst is present in the reactor in an amount in the range of 0.3 to 1.3 mg/kg of diluent.

4. A process according to claim 3 wherein the trialkylboron compound is triethylboron.

5. A process according to claim 1 wherein the trialkylboron compound is triethylboron.

6. A process according to claim 5 wherein the catalyst system has an average pore diameter in the range of about 50 to 150 Angstroms.

7. A process according to claim 2 wherein the trialkylboron compound is triethylboron.

8. A process according to claim 4 wherein said reactor temperature is within a range of about 210° F. to 220° F.

* * * * *